US012432513B2

(12) United States Patent
Tu et al.

(10) Patent No.: US 12,432,513 B2
(45) Date of Patent: Sep. 30, 2025

(54) AUDIO PARAMETER OPTIMIZING METHOD AND COMPUTING APPARATUS RELATED TO AUDIO PARAMETERS

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 320 days.

(21) Appl. No.: 18/347,567

(22) Filed: Jul. 6, 2023

(65) Prior Publication Data

US 2024/0373183 A1 Nov. 7, 2024

(30) Foreign Application Priority Data

May 5, 2023 (TW) ................................ 112116738

(51) Int. Cl.
*H04S 1/00* (2006.01)
*G10L 19/008* (2013.01)

(52) U.S. Cl.
CPC ............ *H04S 1/007* (2013.01); *G10L 19/008* (2013.01); *H04S 2420/01* (2013.01)

(58) Field of Classification Search
CPC ..... H04S 1/007; H04S 2420/01; G10L 19/008
See application file for complete search history.

(56) References Cited

U.S. PATENT DOCUMENTS

| | | | | |
|---|---|---|---|---|
| 7,848,531 | B1 | 12/2010 | Vickers et al. | |
| 2008/0273747 | A1 | 11/2008 | Rhoads | |
| 2012/0134522 | A1* | 5/2012 | Jenison | H04R 25/505 381/98 |
| 2024/0373187 | A1* | 11/2024 | Tu | G10L 25/30 |
| 2025/0126417 | A1* | 4/2025 | Garudadri | H04W 88/06 |

FOREIGN PATENT DOCUMENTS

| | | | | |
|---|---|---|---|---|
| CN | 101438259 | | 5/2009 | |
| CN | 105228069 | B * | 8/2018 | |
| CN | 113647120 | | 11/2021 | |
| CN | 116017250 | A * | 4/2023 | |
| EP | 0977043 | B1 * | 12/2004 | G01R 15/125 |
| TW | 493161 | | 7/2002 | |
| TW | 200606813 | | 2/2006 | |
| TW | I687920 | | 3/2020 | |
| TW | 202022852 | | 6/2020 | |

* cited by examiner

*Primary Examiner* — David L Ton
(74) *Attorney, Agent, or Firm* — JCIPRNET

(57) ABSTRACT

An audio parameter optimizing method and a computing apparatus related to audio parameters are disclosed. In the method, a sound signal is divided into multiple sound frames in a time domain, and a wide dynamic range compression (WDRC) parameter corresponding to the sound signal is determined according to a maximum root mean square (RMS) and an average RMS. Output powers corresponding to input powers between the maximum RMS and the average RMS in the WDRC parameter are increased. Accordingly, a proper parameter could be provided.

15 Claims, 3 Drawing Sheets

AUDIO PARAMETER OPTIMIZING METHOD AND COMPUTING APPARATUS RELATED TO AUDIO PARAMETERS

CROSS-REFERENCE TO RELATED APPLICATION

This application claims the priority benefit of Taiwan application serial no. 112116738, filed on May 5, 2023. The entirety of the above-mentioned patent application is hereby incorporated by reference herein and made a part of this specification.

BACKGROUND

Technical Field

This disclosure relates to a sound signal processing, and more particularly, to an audio parameter optimizing method and a computing apparatus related to audio parameters.

Description of Related Art

After a mobile apparatus is connected to a smart speaker set, audio signals may be transmitted to a smart speaker. After the smart speaker decodes the audio signals and performs a sound effect processing, music may be played.

It is worth noting that audio adjustment of an audio system usually focuses on a part of the sound that a user wants to enhance. However, different audio sources may have different sound characteristics. Therefore, a single audio adjustment is not suitable for all the audio signals.

SUMMARY

An embodiment of the disclosure provides an audio parameter optimizing method and a computing apparatus related to audio parameters, and provides the proper audio parameters.

An audio parameter optimizing method in the embodiment of the disclosure includes (but is not limited to) the following. A sound signal is divided into multiple sound frames in a time domain. A wide dynamic range compression (WDRC) parameter corresponding to the sound signal is adjusted according to a maximum root mean square (RMS) and an average root mean square of the sound frames. An output power corresponding to an input power between the maximum root mean square and the average root mean square in the wide dynamic range compression parameter is increased.

A computing apparatus related to audio parameters in the embodiment of the disclosure includes (but is not limited to) a storage and a processor. The storage device is configured to store a program code. The processor is coupled to the storage device. The processor is configured to load the program code to divide a sound signal into multiple sound frames in a time domain, and adjust a wide dynamic range compression parameter corresponding to the sound signal according to a maximum root mean square and an average root mean square of the sound frames. The processor is configured to increase an output power corresponding to an input power between the maximum root mean square and the average root mean square in the wide dynamic range compression parameter.

Based on the above, according to the audio parameter optimizing method and the computing apparatus related to the audio parameters in the embodiment of the disclosure, the wide dynamic range compression parameter suitable for music listening may be defined based on sound features (e.g., the maximum root mean square and the average root mean square).

In order for the aforementioned features and advantages of the disclosure to be more comprehensible, embodiments accompanied with drawings are described in detail below.

DETAILED DESCRIPTION OF DISCLOSED EMBODIMENTS

Figure 1:
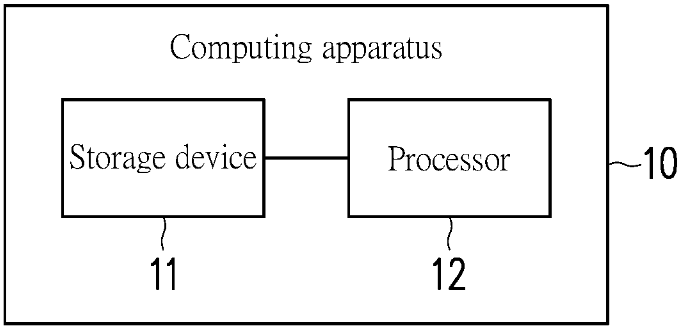
FIG. 1 is a block diagram of elements of a computing apparatus according to an embodiment of the disclosure.

FIG. 1 is a block diagram of elements of a computing apparatus according to an embodiment of the disclosure. Referring to FIG. 1, a computing apparatus 10 includes (but is not limited to) a storage device 11 and a processor 12. The computing apparatus 10 may be a desktop computer, a notebook computer, an AIO computer, a smartphone, a tablet computer, a smart speaker, a smart assistant apparatus, a server, or other electronic apparatuses.

The storage device 11 may be any type of fixed or removable random access memory (RAM), read-only memory (ROM), flash memory, conventional hard disk drive (HDD), solid-state drive (SSD), or similar elements. In an embodiment, the storage device 11 is configured to record program codes, software modules, configuration settings, data, or files (such as sound signals, sound features, or parameters), and will be described in detail in subsequent embodiments.

The processor 12 is coupled to the storage device 11. The processor 12 may be a central processing unit (CPU), a graphic processing unit (GPU), or other programmable general-purpose or special-purpose microprocessors, a digital signal processor (DSP), a programmable controller, a field programmable gate array (FPGA), an application-specific integrated circuit (ASIC), a neural network accelerator, or other similar elements or a combination of the above elements. In an embodiment, the processor 12 is configured to perform all or some of operations of the computing apparatus 10, and may load and execute the software modules, the files, and/or the data stored in the storage device 11. In some embodiments, functions of the processor 12 may be implemented through software.

Hereinafter, the various elements, modules, and signals in the computing apparatus 10 will be used to describe a method in the embodiment of the disclosure. Each of processes of the method may be adjusted according to an implementation situation and are not limited thereto.

Figure 2:
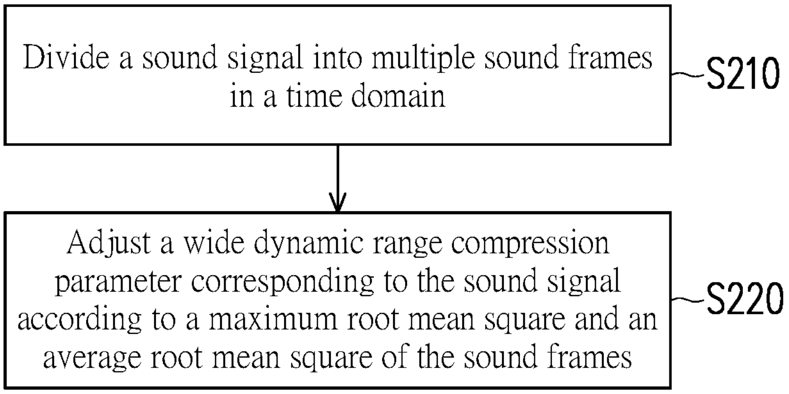
FIG. 2 is a flowchart of an audio parameter optimizing method according to an embodiment of the disclosure.

FIG. 2 is a flowchart of an audio parameter optimizing method according to an embodiment of the disclosure. Referring to FIG. 2, the processor 12 divides a sound signal into multiple sound frames in a time domain (step S210). In an embodiment, the sound signal may be a music sound signal. In other embodiments, the sound signal may be a sound signal of voice, animal sound, environmental sound, machine operation sound, synthetic sound, or a combination thereof. Time lengths of the sound frames may be, for example, 50, 100, or 500 milliseconds (ms), but the disclosure is not limited thereto. The processor 12 may extract one sound frame from the (digital) sound signal every same time length. The sound frames may be arranged in order to form the sound signal.

Figure 3:
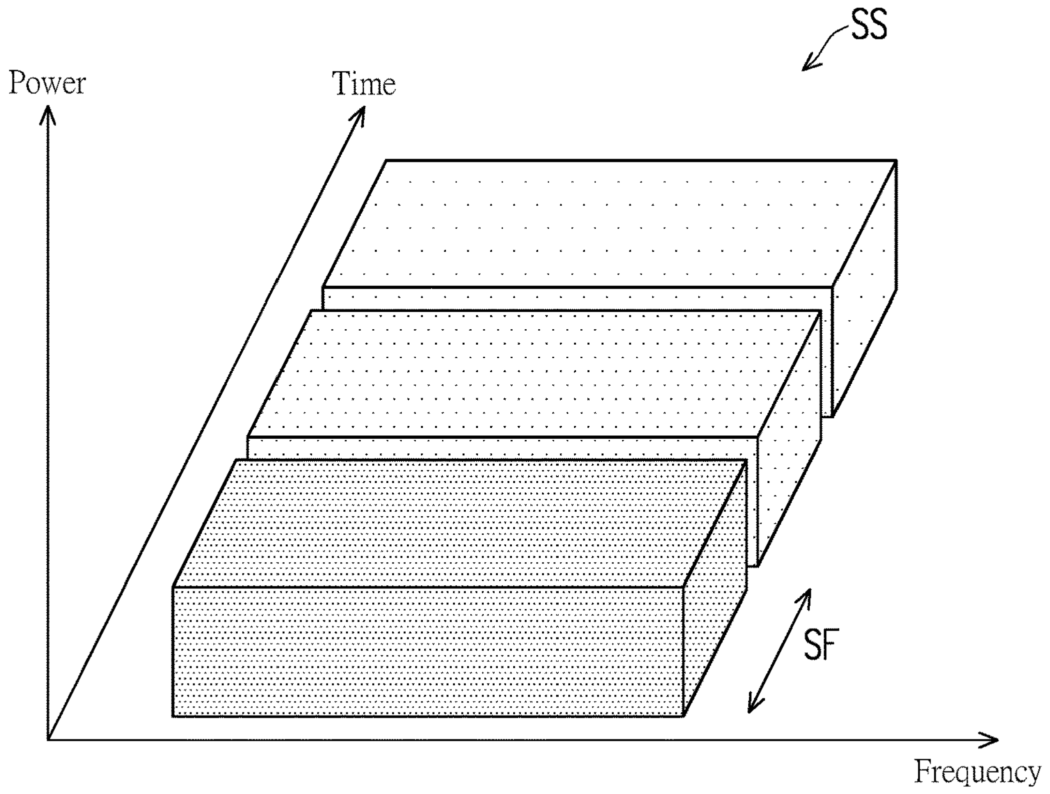
FIG. 3 is a schematic diagram of signal division according to an embodiment of the disclosure.

For example, FIG. 3 is a schematic diagram of signal division according to an embodiment of the disclosure. Referring to FIG. 3, a time length of a sound frame SF is taken 50 ms as an example. One sound frame SF may be divided from a sound signal SS every 50 ms.

According to different design requirements, in some embodiments, the processor 12 may select some of the sound frames for subsequent use. In addition, different sound frames may have different time lengths.

In an embodiment, the processor 12 may divide a left sound channel and a right sound channel of the sound signal respectively into the sound frames. The sound signal is a binaural stereo signal. In some application scenarios, content of the left sound channel and the right sound channel of the single sound signal may be different. For example, in a symphony, sound of string instruments in a left sound channel thereof occupies a larger proportion, while sound of wind instruments in a right channel thereof occupies a larger proportion. The sound signals of the left sound channel and the right sound channel may be regarded as two sound signals. The processor 12 may divide the two sound signals into a sound frame of the left sound channel and a sound frame of the right sound channel respectively. Assuming that each of the sound channels may be divided into M sound frames (M is a positive integer), there are a total of 2M sound signals for the two sound channels.

Referring to FIG. 2, the processor 12 may adjust a wide dynamic range compression parameter corresponding to the sound signal according to a maximum root mean square and an average root mean square of the divided sound frames (step S220). Specifically, the root mean square is a calculation method to measure a sound pressure of a sound wave. The processor 12 may sample each of the sound signals at specific sampling intervals and measure intensity of multiple sampling points, that is, the intensity of the sampling points in a waveform of the sound signal.

The processor 12 may calculate a power of each of the sound frames according to the following Formula (1) (i.e., the root mean square).

$$x_{RMS} = \sqrt{\frac{\left(x_1^2 + x_2^2 + \ldots + x_n^2\right)}{n}} \quad (1)$$

$x_{RMS}$ is the power of the single sound frame (i.e., the root mean square), and n is a total number of the sampling points in a certain sound frame. x1 is intensity of the certain sound frame at the first sampling point (e.g., a first sampling value). x2 is the intensity of the certain sound frame at the second sampling point (e.g., a second sampling value). xn is the intensity of the certain sound frame at the $n^{th}$ sampling point (e.g., an $n^{th}$ sampling value). The rest may be derived by analogy.

In addition, the maximum root mean square is a maximum power of the sound frames divided from the single sound signal. The average root mean square is a power average of the sound frames divided from the single sound signal. Based on an experimental result, for the sound signal related to music listening, an (input) power interval between the maximum root mean square and the average root mean square may be regarded as an important interval. For the important interval, an output power may be appropriately amplified. The sound signal used for the music listening may refer to a sound signal of music genre or the sound signal expected to be played through home stereos, smart speakers, or headphones.

On the other hand, wide dynamic range compression may adjust the output power according to changes in the input power of the sound signal to be adapted accordingly to specific or limited hearing dynamic ranges. However, different sound signals have different crest factors (a peak value of the waveform divided by a root mean square of the waveform), which makes the single wide dynamic range compression parameter not applicable to all the sound signals. In an embodiment, the wide dynamic range compression parameter is a corresponding relationship between the input power and the output power. For example, an input power of −10 decibels (dB) corresponds to an output power of −8 dB. The corresponding relationship may be represented or recorded through a lookup table or function.

For example, in determining the wide dynamic range compression parameter, the processor 12 regards the power interval between the maximum root mean square and the average root mean square of the input power as the important interval and amplifies the output power corresponding to the important interval accordingly. It is assumed that a ratio of the input power to the corresponding output power in the original wide dynamic range compression parameters is 1:1. For the above important interval, the processor 12 may adjust the ratio of the input power to the corresponding output power in the wide dynamic range compression parameter to (for example) 1:1.2 to 1.5. However, the disclosure is not limited thereto, and an upper limit of the output power is 0 dB.

In an embodiment, the processor 12 may enable a change amount of the output power corresponding to the input power interval between the maximum root mean square and the average root mean square in the adjusted wide dynamic range compression parameter to be equal to the change amount of the output power corresponding to the input power interval in the unadjusted wide dynamic range compression parameter. Specifically, the wide dynamic range compression parameter is the corresponding relationship between the input power and the output power. When the corresponding relationship is mapped to an X-Y coordinate system (for example, the input power corresponds to an X-axis, and the output power corresponds to a Y-axis), linear, curve, and/or other functions may be used to represent the corresponding relationship.

Figure 4:
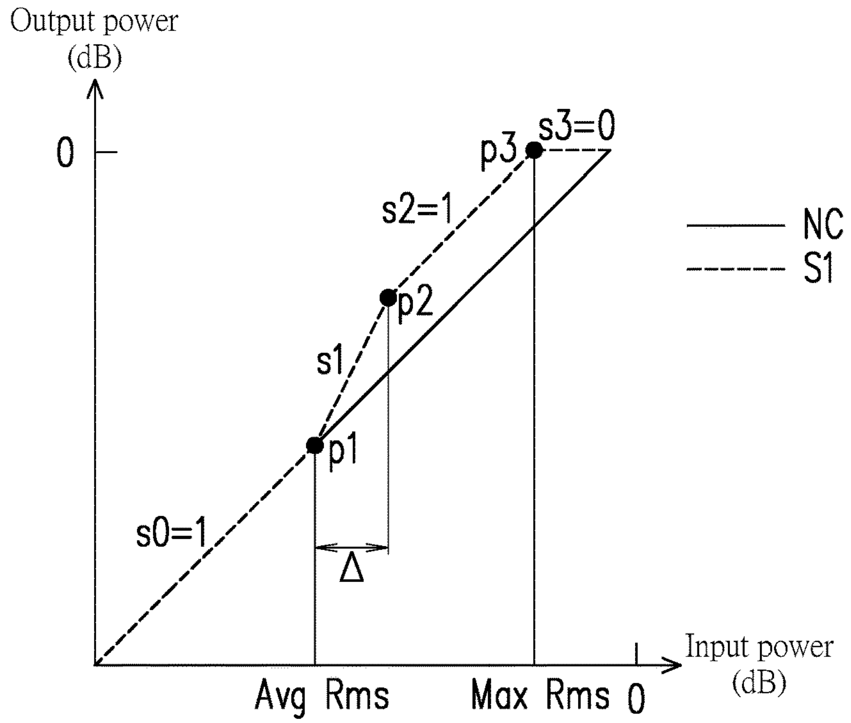
FIG. 4 is a schematic diagram of parameter adjustment according to an embodiment of the disclosure.

For example, FIG. 4 is a schematic diagram of parameter adjustment according to an embodiment of the disclosure. Referring to FIG. 4, in an unadjusted wide dynamic range compression parameter NC, the ratio of the input power to the corresponding output power is the same. Therefore, a linear function with a slope of s0=1 may be used to represent the corresponding relationship between the input power and the output power.

On the other hand, a part enhanced by a wide dynamic range compression parameter S1 for the music listening is the input power interval from an average root mean square (Avg Rms) to a maximum root mean square (Max Rms). Here, enhancement refers to an output power value being greater than a corresponding input power value. Therefore, compared to the unadjusted wide dynamic range compression parameter NC, the output power of the wide dynamic range compression parameter S1 is greater from an inflection point p1 to an inflection point p3. That is, the output power value between the inflection point p1 (the input power corresponds to the X-axis, and the output power corresponds to the Y-axis with coordinates (Avg Rms, Avg Rms)) and the inflection point p3 (coordinates (Max Rms, 0)) is greater than the corresponding input power value. The inflection point indicates that the linear functions of the adjacent input power and output power have different slopes.

For other input power intervals (for example, values thereof are less than the average root mean square Avg Rms corresponding to the inflection point p1) (regarded as non-important intervals, such as noise), the wide dynamic range compression parameter S1 may be the same as the unadjusted wide dynamic range compression parameter NC. That is, the output power values from the inflection point p1 to the inflection point p3 are equal to the corresponding input power values.

In order to reduce distortion (e.g., discontinuous amplification), a slope s2 of the input power interval from the inflection point p2 to the inflection point p3 in the wide dynamic range compression parameter S1 may be equal to the slope of s0=1. In other words, compared to the unadjusted wide dynamic range compression parameter NC, the change amount of the output power from the inflection point p2 to the inflection point p3 in the wide dynamic range compression parameter S1 is the same.

In an embodiment, the processor 12 may define a starting point of the input power interval for the linear function with the same slope or the same change amount of the output power within a unit interval thereof according to the root mean square. A difference between the starting point and the root mean square is 0 to 6 decibels (dB). Taking FIG. 4 as an example, the inflection point p2 is the starting point, and a difference Δ between the inflection point p2 and the inflection point p1 (corresponding to the average root mean square Avg Rms) in the input power is 3 dB. In addition, coordinates of the inflection point p2 are (Avg Rms+Δ, Avg Rms+Δ−Max Rms). In this way, the discontinuous amplification due to the excessively high slope s1 may be avoided.

In an embodiment, the processor 12 may increase the output power corresponding to the input power between the maximum root mean square and the average root mean square in the wide dynamic range compression parameter to at most 0 dB. In other words, a maximum value of the output power in the wide dynamic range compression parameter is 0 dB. In this way, damage to a rear-end speaker caused by the excessive output power may be avoided.

Taking FIG. 4 as an example, it is assumed that the output power at the inflection point p3 (corresponding to the maximum root mean square Max Rms) has reached 0 dB. Therefore, the output powers corresponding to other input powers with values between the maximum root mean square Max Rms and 0 dB are all 0 dB, and a slope s3 of the linear function corresponding to the power interval is 0.

Figure 5:
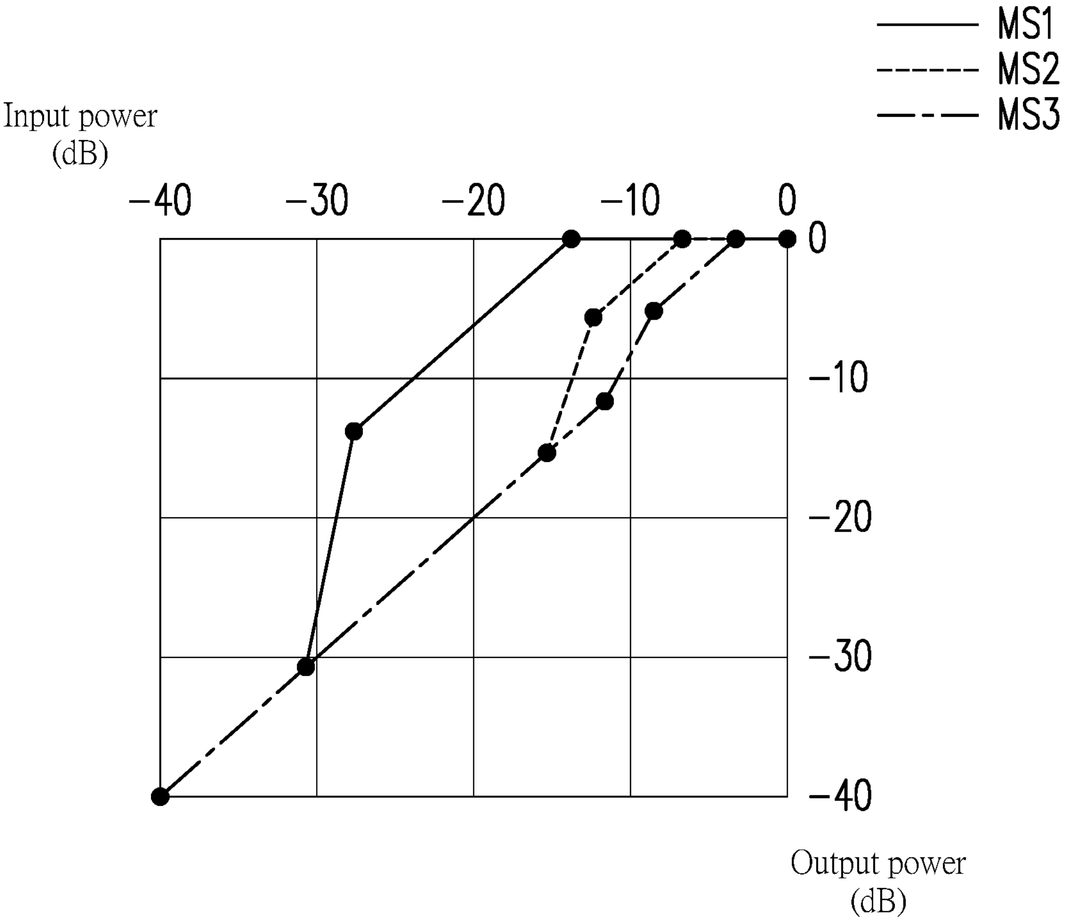
FIG. 5 is a schematic diagram of parameters of different music according to an embodiment of the disclosure.

FIG. 5 is a schematic diagram of parameters of different music according to an embodiment of the disclosure. Table (1) shows maximum root mean squares and average root mean squares of sound signals MS1, MS2, and MS3 for three pieces of music. Referring to FIG. 5 and Table (1), for the sound signal MS1, the output power in the power interval between −30.725 dB and −13.92 dB is amplified. For the sound signal MS2, the output power in the power interval between −15.505 dB and −6.83 dB is amplified. For the sound signal MS3, the output power in the power interval between −11.645 dB and −3.38 dB is amplified. The output power within the input power interval thereof may be maintained equal to the input power.

TABLE 1

| | Maximum root mean square (dB) | Average root mean square (dB) |
|---|---|---|
| MS1 | −13.92 | −30.725 |
| MS2 | −6.83 | −15.505 |
| MS3 | −3.38 | −11.645 |

In an embodiment, the processor 12 may play the sound signal adjusted by the corresponding wide dynamic range compression parameter through a speaker. For example, the digital signal processor, a digital-to-analog converter, or other elements adjusts the sound signal according to the determined wide dynamic range compression parameter, then convert a digital sound signal to an analog sound signal, and output the analog sound signal through the speaker. In addition, as long as the input power of the sound signal is within the above important interval, the corresponding output power may be amplified.

Based on the above, in the audio parameter optimizing method and the computing apparatus related to the audio parameters of the disclosure, the appropriate wide dynamic range compression parameter is provided for the music listening, and distortion amplification and damage to the rear-end output apparatus may be avoided.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An audio parameter optimizing method, comprising:
- dividing a sound signal into a plurality of sound frames in a time domain; and
- adjusting a wide dynamic range compression (WDRC) parameter corresponding to the sound signal according to a maximum root mean square (RMS) and an average root mean square of the sound frames, wherein an output power corresponding to an input power between the maximum root mean square and the average root mean square in the wide dynamic range compression parameter is increased.

2. The audio parameter optimizing method according to claim 1, wherein adjusting the wide dynamic range compression parameter corresponding to the sound signal according to the maximum root mean square and the average root mean square of the sound frames comprises:
- enabling a change amount of the output power corresponding to an input power interval between the maximum root mean square and the average root mean square in the adjusted wide dynamic range compression parameter to be equal to a change amount of the output power corresponding to the input power interval in the unadjusted wide dynamic range compression parameter.

3. The audio parameter optimizing method according to claim 2, further comprising:
- defining a starting point of the input power interval according to the average root mean square, wherein a difference between the starting point and the average root mean square is 0 to 6 decibels (dB).

4. The audio parameter optimizing method according to claim 3, wherein the difference between the starting point and the average root mean square is 3 dB.

5. The audio parameter optimizing method according to claim 2, further comprising:

configuring a linear function with a slope for representing a relationship between an input power within the input power interval and an output power in the adjusted wide dynamic range compression parameter as same as a linear function with a slope for representing a relationship between an input power within the input power interval and an output power in the unadjusted wide dynamic range compression parameter.

6. The audio parameter optimizing method according to claim 1, further comprising:

playing the sound signal adjusted by the adjusting wide dynamic range compression parameter through a speaker.

7. The audio parameter optimizing method according to claim 1, wherein adjusting the wide dynamic range compression parameter corresponding to the sound signal according to the maximum root mean square and the average root mean square of the sound frames comprises:

increasing the output power corresponding to the input power between the maximum root mean square and the average root mean square in the wide dynamic range compression parameter to at most 0 dB.

8. The audio parameter optimizing method according to claim 1, wherein dividing the sound signal into the sound frames in the time domain comprises:

dividing a left sound channel and a right sound channel of the sound signal into the sound frames respectively.

9. A computing apparatus related to audio parameters, comprising:

a storage device storing a program code; and a processor coupled to the storage device and configured to load the program code to:

divide a sound signal into a plurality of sound frames in a time domain; and adjust a wide dynamic range compression parameter corresponding to the sound signal according to a maximum root mean square and an average root mean square of the sound frames, wherein an output power corresponding to an input power between the maximum root mean square and the average root mean square in the wide dynamic range compression parameter is increased.

10. The computing apparatus according to claim 9, wherein the processor is further configured to:

enable a change amount of the output power corresponding to an input power interval between the maximum root mean square and the average root mean square in the adjusted wide dynamic range compression parameter to be equal to a change amount of the output power corresponding to the input power interval in the unadjusted wide dynamic range compression parameter.

11. The computing apparatus according to claim 10, wherein the processor is further configured to:

define a starting point of the input power interval according to the average root mean square, wherein a difference between the starting point and the average root mean square is 0 to 6 decibels (dB).

12. The computing apparatus according to claim 11, wherein the difference between the starting point and the average root mean square is 3 dB.

13. The computing apparatus according to claim 10, wherein a linear function with a slope for representing a relationship between an input power within the input power interval and an output power in the adjusted wide dynamic range compression parameter is same as a linear function with a slope for representing a relationship between an input power within the input power interval and an output power in the unadjusted wide dynamic range compression parameter.

14. The computing apparatus according to claim 9, wherein the processor is further configured to:

increase the output power corresponding to the input power between the maximum root mean square and the average root mean square in the wide dynamic range compression parameter to at most 0 dB.

15. The computing apparatus according to claim 9, wherein the processor is further configured to:

dividing a left sound channel and a right sound channel of the sound signal into the sound frames respectively.

* * * * *